US010297122B2

(12) United States Patent
Birnbaum et al.

(10) Patent No.: US 10,297,122 B2
(45) Date of Patent: *May 21, 2019

(54) WEARABLE HAPTIC EFFECTS WITH PERMISSIONS SETTINGS

(71) Applicant: Immersion Corporation, San Jose, CA (US)

(72) Inventors: David M. Birnbaum, Oakland, CA (US); Stephen D. Rank, San Jose, CA (US); Leonard Soskin, San Mateo, CA (US); Danny A. Grant, Laval (CA); Robert W. Heubel, San Leandro, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/970,378

(22) Filed: May 3, 2018

(65) Prior Publication Data

US 2018/0253948 A1 Sep. 6, 2018

Related U.S. Application Data

(63) Continuation of application No. 15/134,797, filed on Apr. 21, 2016, now Pat. No. 9,990,815.

(Continued)

(51) Int. Cl.
*G08B 6/00* (2006.01)
*G06F 3/01* (2006.01)
(Continued)

(52) U.S. Cl.
CPC ............... *G08B 6/00* (2013.01); *A63F 13/25* (2014.09); *G06F 1/163* (2013.01); *G06F 3/011* (2013.01);
(Continued)

(58) Field of Classification Search
CPC . G08B 6/00; G06F 3/016; G06F 21/31; G06F 21/6218; G06F 3/011
See application file for complete search history.

(56) References Cited

U.S. PATENT DOCUMENTS

2003/0067440 A1 4/2003 Rank
2012/0028577 A1 2/2012 Rodriguez
(Continued)

FOREIGN PATENT DOCUMENTS

EP 2806352 A1 11/2014

OTHER PUBLICATIONS

A. Cuthbertson; "Virtual reality rape: Transhumanists highlight ethical issues arising from new technology"; Jun. 8, 2015; http://www.ibtimes.co.uk/virtual-reality-rape-transhumanists-highlight-ethical-issues-arising-new-technology-1505015.
(Continued)

*Primary Examiner* — Nader Bolourchi
(74) *Attorney, Agent, or Firm* — Miles & Stockbridge P.C.

(57) ABSTRACT

A system, method and computer-readable medium for generating haptic effects are provided. Haptic permissions settings are received for a user. The haptic permissions settings are associated with permitted haptic parameter ranges for the user. Haptic parameters are then received. For each haptic parameter that falls outside the permitted haptic parameter ranges, the haptic parameter is modified to create a modified haptic parameter that falls within the permitted haptic parameter ranges. A haptic signal is generated based on the haptic parameters that fall within the permitted haptic parameter ranges and the modified haptic parameters. The haptic signal is then output to a haptic output device to generate the haptic effects for the user.

24 Claims, 3 Drawing Sheets

Related U.S. Application Data

(60) Provisional application No. 62/296,959, filed on Feb. 18, 2016.

(51) Int. Cl.
*G06F 21/31* (2013.01)
*G06F 21/62* (2013.01)
*G06F 1/16* (2006.01)
*G06F 9/445* (2018.01)
*G06F 3/0484* (2013.01)
*A63F 13/25* (2014.01)

(52) U.S. Cl.
CPC .......... *G06F 3/016* (2013.01); *G06F 3/04847* (2013.01); *G06F 9/445* (2013.01); *G06F 21/31* (2013.01); *G06F 21/6218* (2013.01); *A63F 2300/1037* (2013.01); *G06F 2203/013* (2013.01)

(56) References Cited

U.S. PATENT DOCUMENTS

| | | |
|---|---|---|
| 2013/0227410 A1 | 8/2013 | Sridhara et al. |
| 2014/0267076 A1 | 9/2014 | Birnbaum et al. |
| 2014/0267911 A1 | 9/2014 | Grant |
| 2014/0347176 A1 | 11/2014 | Modarres et al. |

OTHER PUBLICATIONS

Phone User Guide for iOS 8 Software, Apple Inc., Sep. 17, 2014.

WEARABLE HAPTIC EFFECTS WITH PERMISSIONS SETTINGS

CROSS REFERENCE TO RELATED APPLICATIONS

This application is a continuation of U.S. patent application Ser. No. 15/134,797 (filing date Apr. 21, 2016), which claims priority to U.S. Provisional Patent Application Ser. No. 62/296,959 (filing date Feb. 18, 2016), the contents of which are incorporated herein by reference in their entireties.

FIELD

One embodiment is directed generally to haptic effects, and in particular to haptic effects on wearable devices.

BACKGROUND

Virtual reality ("VR") refers to immersive multimedia or computer-simulated reality. VR attempts to replicate an environment that simulates a physical presence in places in the real world or an imagined world, allowing the user to interact in that world. VR artificially creates sensory experiences, which can include sight, touch, hearing and smell.

Many "virtual realities" are displayed either on a computer screen or with special stereoscopic displays, and some simulations include additional sensory information. Some VR system, in addition to audio sensory information, include advanced haptic systems which provide tactile information, generally known as force feedback or haptic feedback, particularly for medical, gaming and military applications.

SUMMARY

Embodiments of the present invention provide a system, method and computer-readable medium for generating haptic effects. Haptic permissions settings are received for a user. The haptic permissions settings are associated with permitted haptic parameter ranges for the user. Haptic parameters are then received. For each haptic parameter that falls outside the permitted haptic parameter ranges, the haptic parameter is modified to create a modified haptic parameter that falls within the permitted haptic parameter ranges. A haptic signal is generated based on the haptic parameters that fall within the permitted haptic parameter ranges and the modified haptic parameters. The haptic signal is then output to a haptic output device to generate the haptic effects for the user.

DETAILED DESCRIPTION

One embodiment provides permissions settings and modifying/filtering for haptic effects that are generated and applied to a user of a virtual reality device or any other haptically enabled device. Because the haptic effects, especially for wearable devices, can have a physical effect on a human body, the permissions settings can allow a user to control haptic effects that may potentially be uncomfortable, unwanted, painful and injurious.

Figure 1:
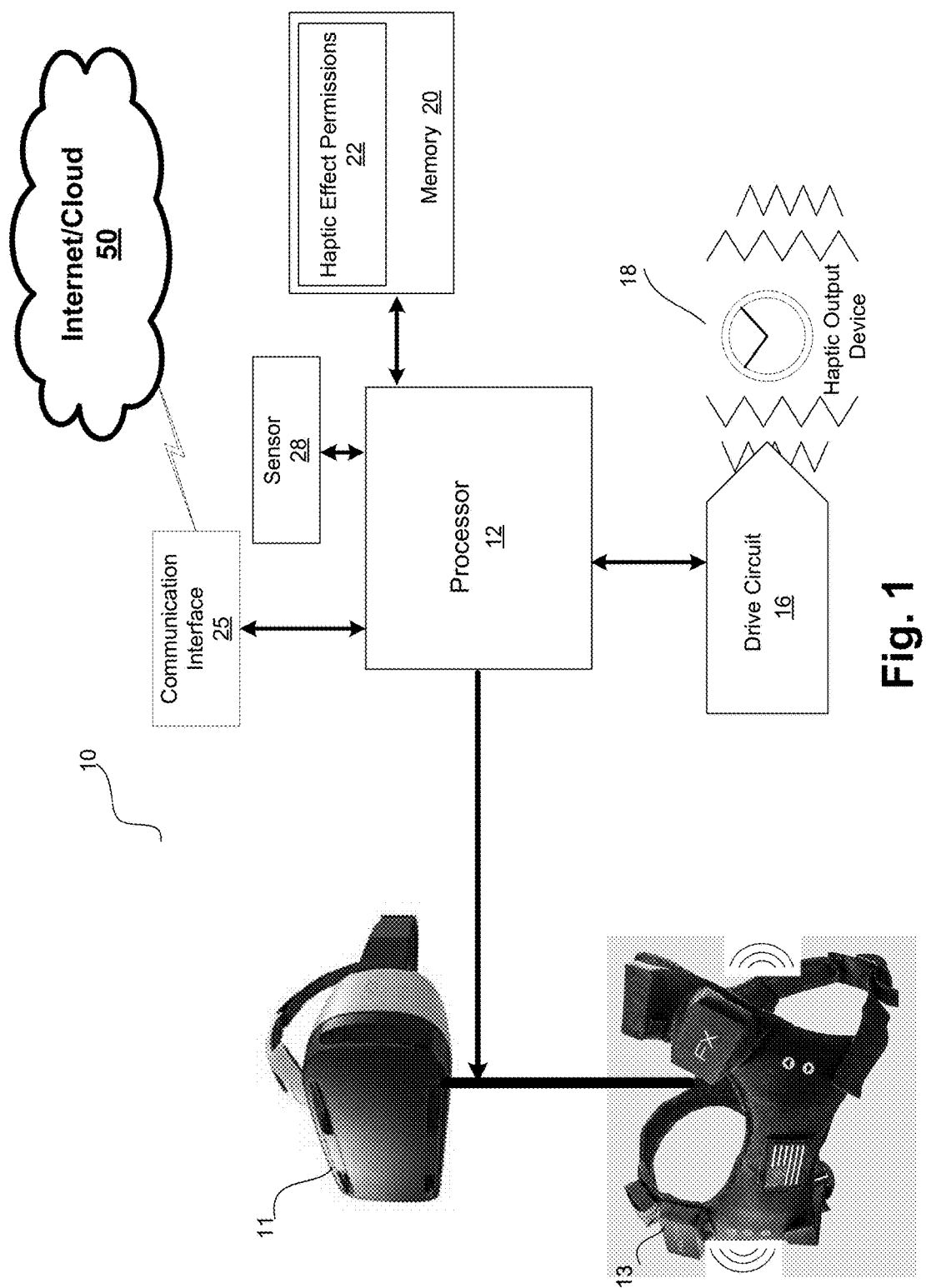
FIG. 1 is a block diagram of a haptically-enabled virtual reality ("VR") system that can implement an embodiment of the present invention.

FIG. 1 is a block diagram of a haptically-enabled virtual reality ("VR") system 10 that can implement an embodiment of the present invention. System 10 includes a headset 11 and a wearable jacket/vest/full body suit 13 (referred to as "haptic suit" 13). Headset 11 provides audio/visual immersion for VR system 10. Haptic suit 13 provides haptic effects in conjunction with the VR immersion experience provided by headset 11. Although shown in FIG. 1 as a vest, haptic suit 13 in other embodiments can be configured to contact any and all areas of a user's body, and may include other discrete elements for contacting other areas of the body. System 10, instead of being worn by the user, can also be held by the user, such as a gamepad, motion wand, etc. All body contacting elements, including headset 11 and haptic suit 13, are coupled via a wireless or wired connection.

Internal to system 10 is a haptic feedback system that generates haptic effects on system 10. The haptic feedback system includes a processor or controller 12. Coupled to processor 12 is a memory 20 and a drive circuit 16, which is coupled to a haptic output device 18. Processor 12 may be any type of general purpose processor, or could be a processor specifically designed to provide haptic effects, such as an application-specific integrated circuit ("ASIC"). Processor 12 may be the same processor that operates the entire system 10, or may be a separate processor. Processor 12 can decide what haptic effects are to be played and the order in which the effects are played based on high level parameters. In general, the high level parameters that define a particular haptic effect include magnitude, frequency and duration. Low level parameters such as streaming motor commands could also be used to determine a particular haptic effect. A haptic effect may be considered "dynamic" if it includes some variation of these parameters when the haptic effect is generated or a variation of these parameters based on a user's interaction.

Processor 12 outputs the control signals to drive circuit 16, which includes electronic components and circuitry used to supply haptic output device 18 with the required electrical current and voltage (i.e., "motor signals") to cause the desired haptic effects to be generated. System 10 may include multiple haptic output devices 18, and each haptic output device 18 may include a separate drive circuit 16, all coupled to a common processor 12. Memory device 20 can be any type of transitory or non-transitory storage device or computer-readable medium, such as random access memory ("RAM") or read-only memory ("ROM"). Communication media may include computer readable instructions, data structures, program modules, or other data in a modulated data signal such as a carrier wave or other transport mechanism, and includes any information delivery media.

Memory 20 stores instructions executed by processor 12, such as operating system instructions. Among the instructions, memory 20 includes a haptic effect permissions module 22 which is instructions that, when executed by processor 12, generate haptic effects based on permissions, as disclosed in more detail below. Memory 20 may also be located internal to processor 12, or any combination of internal and external memory.

Haptic output device 18 may be any type of device that generates haptic effects, and can be physically located in any area of system 10 to be able to create the desired haptic effect to the desired area of a user's body. In some embodiments, system 10 includes tens or even hundreds of haptic output devices 18, and the haptic output devices can be of different types to be able to generate haptic effects in generally every area of a user's body, and any type of haptic effect. Haptic output device 18 can be located in any portion of system 10, including any portion of headset 11 or haptic suit 13, or can be remotely coupled to any portion of system 10.

In one embodiment, haptic output device 18 is an actuator that generates vibrotactile haptic effects. Actuators used for this purpose may include an electromagnetic actuator such as an Eccentric Rotating Mass ("ERM") in which an eccentric mass is moved by a motor, a Linear Resonant Actuator ("LRA") in which a mass attached to a spring is driven back and forth, or a "smart material" such as piezoelectric, electroactive polymers or shape memory alloys. Haptic output device 18 may also be a device such as an electrostatic friction ("ESF") device or an ultrasonic surface friction ("USF") device, or a device that induces acoustic radiation pressure with an ultrasonic haptic transducer. Other devices can use a haptic substrate and a flexible or deformable surface, and devices can provide projected haptic output such as a puff of air using an air jet, etc. Haptic output device 18 can further be a device that provides thermal haptic effects (e.g., heats up or cools off).

System 10 further includes a sensor 28 coupled to processor 12. Sensor 28 can be used to detect any type of properties of the user of system 10 (e.g., a biomarker such as body temperature, heart rate, etc.), or of the context of the user or the current context (e.g., the location of the user, the temperature of the surroundings, etc.).

Sensor 28 can be configured to detect a form of energy, or other physical property, such as, but not limited to, sound, movement, acceleration, physiological signals, distance, flow, force/pressure/strain/bend, humidity, linear position, orientation/inclination, radio frequency, rotary position, rotary velocity, manipulation of a switch, temperature, vibration, or visible light intensity. Sensor 28 can further be configured to convert the detected energy, or other physical property, into an electrical signal, or any signal that represents virtual sensor information. Sensor 28 can be any device, such as, but not limited to, an accelerometer, an electrocardiogram, an electroencephalogram, an electromyograph, an electrooculogram, an electropalatograph, a galvanic skin response sensor, a capacitive sensor, a hall effect sensor, an infrared sensor, an ultrasonic sensor, a pressure sensor, a fiber optic sensor, a flexion sensor (or bend sensor), a force-sensitive resistor, a load cell, a LuSense $CPS^2$ 155, a miniature pressure transducer, a piezo sensor, a strain gage, a hygrometer, a linear position touch sensor, a linear potentiometer (or slider), a linear variable differential transformer, a compass, an inclinometer, a magnetic tag (or radio frequency identification tag), a rotary encoder, a rotary potentiometer, a gyroscope, an on-off switch, a temperature sensor (such as a thermometer, thermocouple, resistance temperature detector, thermistor, or temperature-transducing integrated circuit), a microphone, a photometer, an altimeter, a biological monitor, a camera, or a light-dependent resistor.

System 10 further includes a communication interface 25 that allows system 10 to communicate over the Internet/cloud 50. Internet/cloud 50 can provide remote storage and processing for system 10 and allow system 10 to communicate with similar or different types of devices. Further, any of the processing functionality described herein can be performed by a processor/controller remote from system 10 and communicated via interface 25.

As described above, haptics and haptic effects are physical interactions with the human body, and as such can have a physical effect on the body. However, the same or similar configurations of haptic hardware and software that are optimized to display desirable haptic sensations can also display uncomfortable, unwanted, painful, and in some cases, injurious forces on the human body. As haptic interfaces proliferate into more and more products and usage contexts, the amount of exposure a person will have to the risk of malicious or malfunctioning or undesired haptic signals will increase exponentially. Therefore, embodiments provide a user-configurable physical personal security solution for interactions with haptic feedback components, which can also be referred to as haptic effects or haptic sensations.

In some embodiments, the undesirable haptic signal could originate from a third party, such as a brand that a user follows. The brand may need to access a certain range of haptic parameters in order to display desirable haptic effects to the user, but the same range of haptic parameters could also be used to display undesirable haptic effects to the user. Therefore, one embodiment maps permission profiles to individual users. The same user who allows third parties access to a certain range of haptic parameters may desire to limit access for other users of the same haptic interface, such as the user's children. Embodiments allow the configurable permissions to be mapped to individual users of the haptic interface.

Further, one embodiment grants permission for a limited time period. For example, in some instances, it is desirable to grant permission to access certain ranges of haptic parameters for a period of time. For example, if a user's child is visiting a virtual aquarium in a VR environment, in order to get the full tactile experience it may be necessary to allow the haptic interface to display certain ranges of sensation (e.g., for the stingray petting zoo) that would at other times be prevented from displaying.

In another example, a person may want to experience snow in a ski simulation. However, that same thermal range may have the ability to cause frostbite, and so in most interactions the user may desire to eliminate the risk of exposing his or her skin to such low temperatures for such long periods of time. Therefore, embodiments allow the user to grant access to certain ranges of haptic parameters for the duration of the ski simulation sequence but not at other times, and/or, within the ski simulation, for a time duration that is less than would cause frostbite.

In some embodiments, the undesirable haptic signal could originate from a second party, such as a friend or acquaintance. For example, a user's spouse may have access to a certain set of haptic parameters, while a user's kids may have access to a different set. A user's personal friends may have a different set of permissions from the user's work colleagues.

Further, one embodiment includes a "panic button" that rescinds permission to access certain ranges of haptic parameters from an entity that previously had access. For example, if a user A grants permission to ranges of haptic sensation to user B that would be considered intimate, and while the two users are interacting, user A decides that he or she no longer wants user B to have access to those permissions, embodiments provide a fast and reliable way to prevent the continuation of haptic effects/sensations that user A has decided are now undesirable. The panic button can be implemented through sensor 28 which can detect, for example, the application of pressure by the user to a certain portion of system 10. Once the pressure exceeds a predetermined amount, the permissions are rescinded. In another embodiment, a certain predetermined audio input, such as a "safe" word, can be used as a panic button.

One embodiment provides for the transposition of haptic signals form impermissible to permissible parameter ranges. If incoming haptic signals fall outside of permissible ranges, embodiments can map the parameters of the incoming haptic signal to a permissible range. Therefore, the user can still get some or most of the experience, or obtain necessary information, without needing to experience undesirable haptic sensations.

Embodiments define ranges of permissible haptic effects based on various parameters, and then determine, before playing a "new" haptic effect or a modification to a dynamic haptic effect, whether the new haptic effect falls within the permissible ranges. Permission to access certain perceptual ranges rely on the definition of those ranges. In embodiments, the ranges can be based on one or more of body loci (i.e., the intended body location of the feedback), temperature, force, vibration strength, frequency, and/or pattern, range of motion, force profile across a range of motion, temporal sequencing of actuators that could be either offensive (e.g., a swastika shape), or intimate (e.g., a sequence of sensations that when combined would constitute a caress), device position on body (e.g., when a wearable is in a certain position, it could have access to one set of parameters, and when it is in a different place and/or position, it could have access to another set of parameters), type of actuators (e.g., block a force based haptic effect but allow a vibration haptic effect, or block vibration but allow air puffs).

Embodiments allow the user to determine the permitted ranges of haptic effects/sensations. The setting of permissions can include a setup sequence that includes exposing a user to certain haptic effect, then incrementing or decrementing the values of the tested haptic parameter(s). The user can then specify when an undesirable sensation is caused, and the system can determine that all parameter values beyond that one are forbidden from being displayed/rendered.

Figure 2:
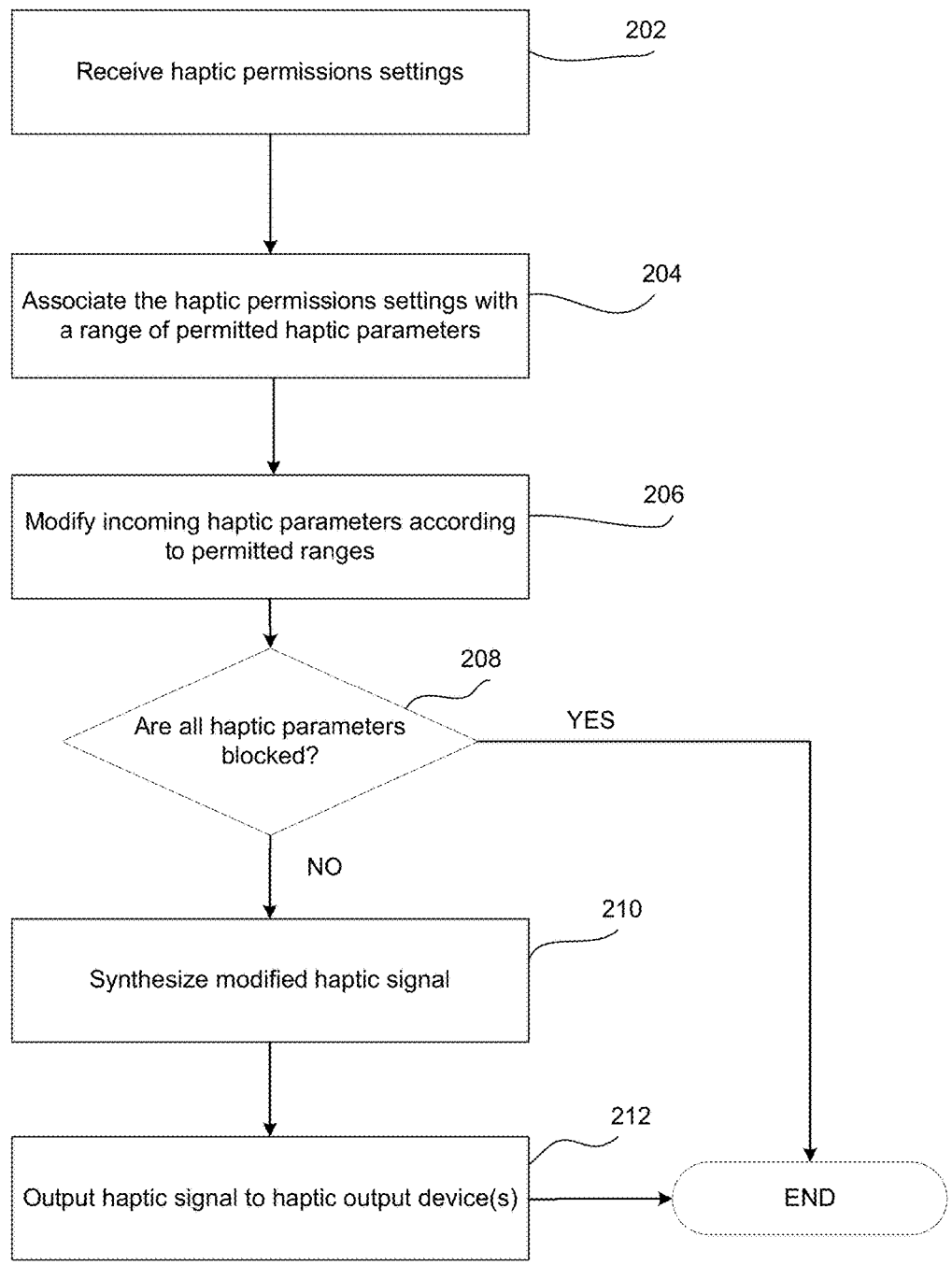
FIG. 2 is a flow diagram of the functionality of the system of FIG. 1 when generating a haptic effect based on permissions settings in accordance with an embodiment.

FIG. 2 is a flow diagram of the functionality of system 10 of FIG. 1 when generating a haptic effect based on permission settings in accordance with an embodiment. In one embodiment, the functionality of the flow diagram of FIG. 2 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 202, system 10 receives haptic permissions settings that specify a set of haptic parameters and/or their ranges. The permissible ranges can be manually entered in a user interface, or can be predetermined or determined via previous user interactions such as a user setting. For example, the user can be previously exposed to a range of haptic parameters, and user feedback regarding permissible ranges is obtained in response to the exposure. A parameter range permission duration/expiration can also be received. In another embodiment, the permissible ranges can be received from other web sites, including social media web sites, or other third party remote locations through Internet/cloud 50 of FIG. 1. For example, permissions from a user's Facebook account can be received at 202. The settings received at 202 can be saved for later use, or copied and forwarded for use by other users.

At 204, the haptic permissions settings are associated with a range of permitted haptic parameters for the specific haptic device user. For example, the origin parameters (i.e., a limit to which parties can initiate haptic effects), duration parameters, magnitude parameters, etc., can be set for specific remote users/third parties. For example, a temperature range can be no higher than 30° C., a force range can be no higher than 10 pounds of force, and a range can encompass specific areas of the body.

At 206, incoming haptic parameters (i.e., parameters generated by processor 12 before the range of permitted parameters are considered) that are either in or out of the permitted ranges are modified/filtered based on the permissible ranges.

At 208, based on the modifying/filtering at 606, or an indication of a "panic" button, it is determined if all of the haptic parameters at 606 are to be blocked/revoked (i.e., there is no haptic output left to be played after the filtering). If all are to be blocked at 608, the functionality is ended.

At 210, the haptic signal is synthesized based on the modifying so that the parameters of the haptic signal are all within the permitted ranges. Parameters outside of the range can either be blocked or transposed so that they are within the permissible ranges.

At 212, the haptic signal is output to haptic output device 18 and therefore rendered. The functionality then ends.

Figure 3:
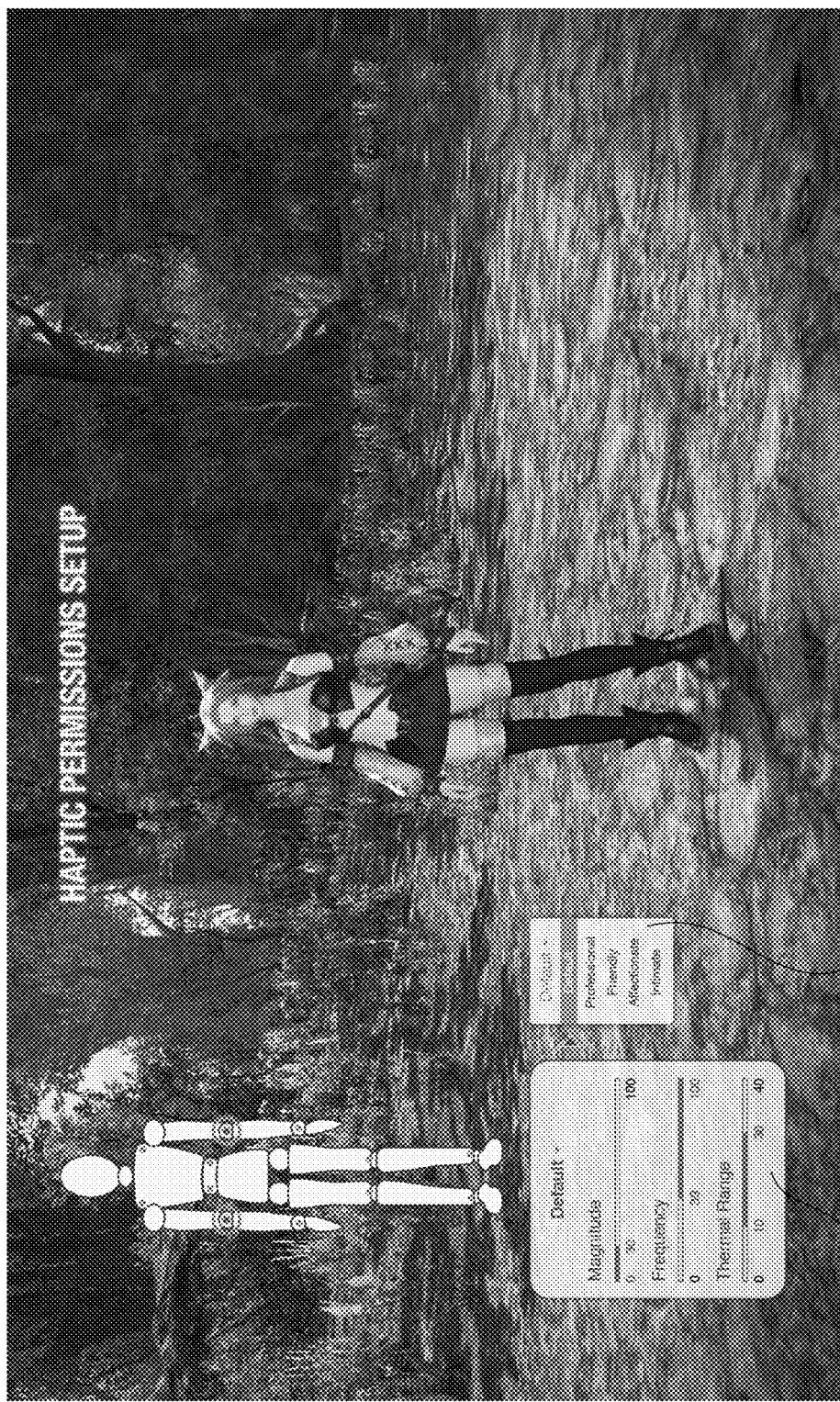
FIG. 3 is an example user interface that receives user settings of permissible haptic parameter ranges in accordance with embodiments of the present invention.

FIG. 3 is an example user interface that receives user settings of permissible haptic parameter ranges in accordance with embodiments of the present invention. UI 300 displays a group 302 of settable haptic parameter ranges that include magnitude, frequency and thermal range. A selectable menu 304 provides presets of haptic permissions, including default, professional, friendly, affectionate and intimate. Each preset incorporates a predefined set of haptic parameters ranges. For example, the "default" preset, shown in FIG. 3, provides a magnitude range of 0-30 percent of actuator presets, a frequency range of 39-100 Hz, and a thermal range of 10-30° C. Other presets, when selected, will generate different values. Further, in one embodiment, the ranges in 302 can be changed by a user using a slider or other method so that the user can provide custom permissible ranges. The selecting of a preset in 304 corresponds to receiving haptic permissions settings in accordance with 202 of FIG. 2. The mapping/associating to a specific range of haptic parameters in 302 corresponds to the associate of 204 of FIG. 2.

As disclosed, embodiments provide functionality to set limits to haptic parameters within which the display of a haptic signal is permitted but outside of which the display of haptic signal is blocked. Embodiments further provide functionality to set this first set of limits as the default limits, and a way to specify that different users of the haptic display have different permitted haptic parameter ranges. Embodiments further provide functionality to specify that different second and third parties have access to different permitted haptic parameter ranges, and a way to specify the expiration time of permitted haptic parameter ranges. Embodiments further provide functionality to transpose haptic signals that are out of the permitted range into the permitted range while retaining the overriding/meaningful qualities of the haptic signal to the extent possible. Embodiments further provide functionality to revoke permission to access certain ranges of haptic parameters, even while the user is experiencing haptics within the currently permitted parameter range. Embodiments further provide functionality to save, copy, forward, and share haptic permissions, and functionality to display the current haptic permissions, represented visually, auditory, haptically, or with other means.

Embodiments can be utilized in VR environments, or in any environment where haptic effects are rendered on a user through wearable haptic output devices, or any other haptic output devices that contact a user's body. For example, a haptically enabled couch or other device, when contacting a user, can be subjected to permissible ranges.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A method of generating haptic effects, comprising:
receiving haptic permissions settings for a user;
associating the haptic permissions settings with permitted haptic parameter ranges for the user;
receiving haptic parameters;
for each haptic parameter that falls outside the permitted haptic parameter ranges, modifying the haptic parameter to create a modified haptic parameter that falls within the permitted haptic parameter ranges;
generating a haptic signal based on the haptic parameters that fall within the permitted haptic parameter ranges and the modified haptic parameters; and
outputting the haptic signal to a haptic output device to generate the haptic effects for the user.

2. The method of claim 1, wherein the haptic parameters are received from a party that is authorized to provide an initiation of the haptic effects for the user.

3. The method of claim 1, further comprising removing the haptic effects for the user when the haptic parameters fall outside of the permitted haptic parameter ranges.

4. The method of claim 2, wherein the haptic permissions settings include a plurality of haptic parameter sets for the user, each haptic parameter set being accessible by a different authorized party and associated with different permitted haptic parameter ranges.

5. The method of claim 1, wherein the permitted haptic parameter ranges include a duration range, a force range, a temperature range, a magnitude range, and a frequency range, and each permitted haptic parameter range includes a lower limit and an upper limit.

6. The method of claim 1, wherein the permitted haptic parameter ranges include an actuator type range and a body area range.

7. The method of claim 1, wherein the permitted haptic parameter ranges include an identity range of particular parties authorized to provide an initiation of the haptic effects for the user.

8. The method of claim 1, wherein the permitted haptic parameter ranges are based at least on one of: body loci, temperature, force, vibration, range of motion, force profile across the range of motion, temporal sequencing of haptic output devices, position of haptic output device on a user's body or type of haptic output devices.

9. A non-transitory computer-readable medium having instructions stored thereon that, when executed by a processor, cause the processor to generate haptic effects, the instructions comprising:
receiving haptic permissions settings for a user;
associating the haptic permissions settings with permitted haptic parameter ranges for the user;
receiving haptic parameters;
for each haptic parameter that falls outside the permitted haptic parameter ranges, modifying the haptic parameter to create a modified haptic parameter that falls within the permitted haptic parameter ranges;
generating a haptic signal based on the haptic parameters that fall within the permitted haptic parameter ranges and the modified haptic parameters; and
outputting the haptic signal to a haptic output device to generate the haptic effects for the user.

10. The non-transitory computer-readable medium of claim 9, wherein the haptic parameters are received from a party that is authorized to provide an initiation of the haptic effects for the user.

11. The non-transitory computer-readable medium of claim 9, further comprising removing the haptic effects for the user when the haptic parameters fall outside of the permitted haptic parameter ranges.

12. The non-transitory computer-readable medium of claim 10, wherein the haptic permissions settings include a plurality of haptic parameter sets for the user, each haptic parameter set being accessible by a different authorized party and associated with different permitted haptic parameter ranges.

13. The non-transitory computer-readable medium of claim 9, wherein the permitted haptic parameter ranges include a duration range, a force range, a temperature range, a magnitude range, and a frequency range, and each permitted haptic parameter range includes a lower limit and an upper limit.

14. The non-transitory computer-readable medium of claim 9, wherein the permitted haptic parameter ranges include an actuator type range and a body area range.

15. The non-transitory computer-readable medium of claim 9, wherein the permitted haptic parameter ranges include an identity range of particular parties authorized to provide an initiation of the haptic effects for the user.

16. The non-transitory computer-readable medium of claim 9, wherein the permitted haptic parameter ranges are based at least on one of: body loci, temperature, force, vibration, range of motion, force profile across the range of motion, temporal sequencing of haptic output devices, position of haptic output device on a user's body or type of haptic output devices.

17. A wearable haptically-enabled system, comprising:
an interface;
a haptic output device;
a memory; and
a processor, coupled to the interface, the haptic output device and the memory, configured to:
receive haptic permissions settings for a user,
associate the haptic permissions settings with permitted haptic parameter ranges for the user,
receive haptic parameters,
for each haptic parameter that falls outside the permitted haptic parameter ranges, modify the haptic parameter to create a modified haptic parameter that falls within the permitted haptic parameter ranges,
generate a haptic signal based on the haptic parameters that fall within the permitted haptic parameter ranges and the modified haptic parameters; and
output the haptic signal to the haptic output device to generate haptic effects for the user.

18. The system of claim 17, wherein the haptic parameters are received from a party that is authorized to provide an initiation of the haptic effects for the user.

19. The system of claim 17, wherein the instructions further comprise to remove the haptic effects for the user when the haptic parameters fall outside of the permitted haptic parameter ranges.

20. The system of claim 18, wherein the haptic permissions settings include a plurality of haptic parameter sets for the user, each haptic parameter set being accessible by a different authorized party and associated with different permitted haptic parameter ranges.

21. The system of claim 17, wherein the permitted haptic parameter ranges include a duration range, a force range, a temperature range, a magnitude range, and a frequency range, and each permitted haptic parameter range includes a lower limit and an upper limit.

22. The system of claim 17, wherein the permitted haptic parameter ranges include an actuator type range and a body area range.

23. The system of claim 17, wherein the permitted haptic parameter ranges include an identity range of particular parties authorized to provide an initiation of the haptic effects for the user.

24. The system of claim 17, wherein the permitted haptic parameter ranges are based at least on one of: body loci, temperature, force, vibration, range of motion, force profile across the range of motion, temporal sequencing of haptic output devices, position of haptic output device on a user's body or type of haptic output devices.

* * * * *